United States Patent [19]
Wetherill et al.

[11] 3,726,570
[45] Apr. 10, 1973

[54] TRACK ASSEMBLY WITH IRREVERSIBLE CONICALLY SHAPED TRACK SHOE NUT

[75] Inventors: Richard H. Wetherill, Morton; Anton T. Gregg, East Peoria, both of Ill.

[73] Assignee: Caterpillar Tractor Co., Peoria, Ill.

[22] Filed: Dec. 17, 1970

[21] Appl. No.: 99,070

[52] U.S. Cl. ................................. 305/54, 85/32 R
[51] Int. Cl. ............................................. B62d 55/28
[58] Field of Search ..................... 85/32 R; 305/54, 305/55, 58

[56] References Cited

UNITED STATES PATENTS 3,179,475  4/1965  Lambie ........................ 305/58
3,219,790  11/1965  Johnson ..................... 85/32 R X
2,120,061  6/1938  Blakeslee .................. 85/32 R X

*Primary Examiner*—Richard J. Johnson
*Attorney*—Fryer, Tjensvold, Feix, Phillips & Lempio

[57] ABSTRACT

A generally conically-shaped nut for attaching a track shoe to a link of an integrated track assembly, employed on a track-type vehicle, comprises a square lower portion and a circular upper portion. The square lower portion seats in a mating recess formed in the link to prevent rotation of the nut when it is "torqued-down" by a threadably attached bolt. Incorrect, inverted assembly of the nut is deterred by visual inspection and by the nut's circular upper portion which tends to freely rotate in the recess of the link when such mis-assembly is attempted.

4 Claims, 4 Drawing Figures

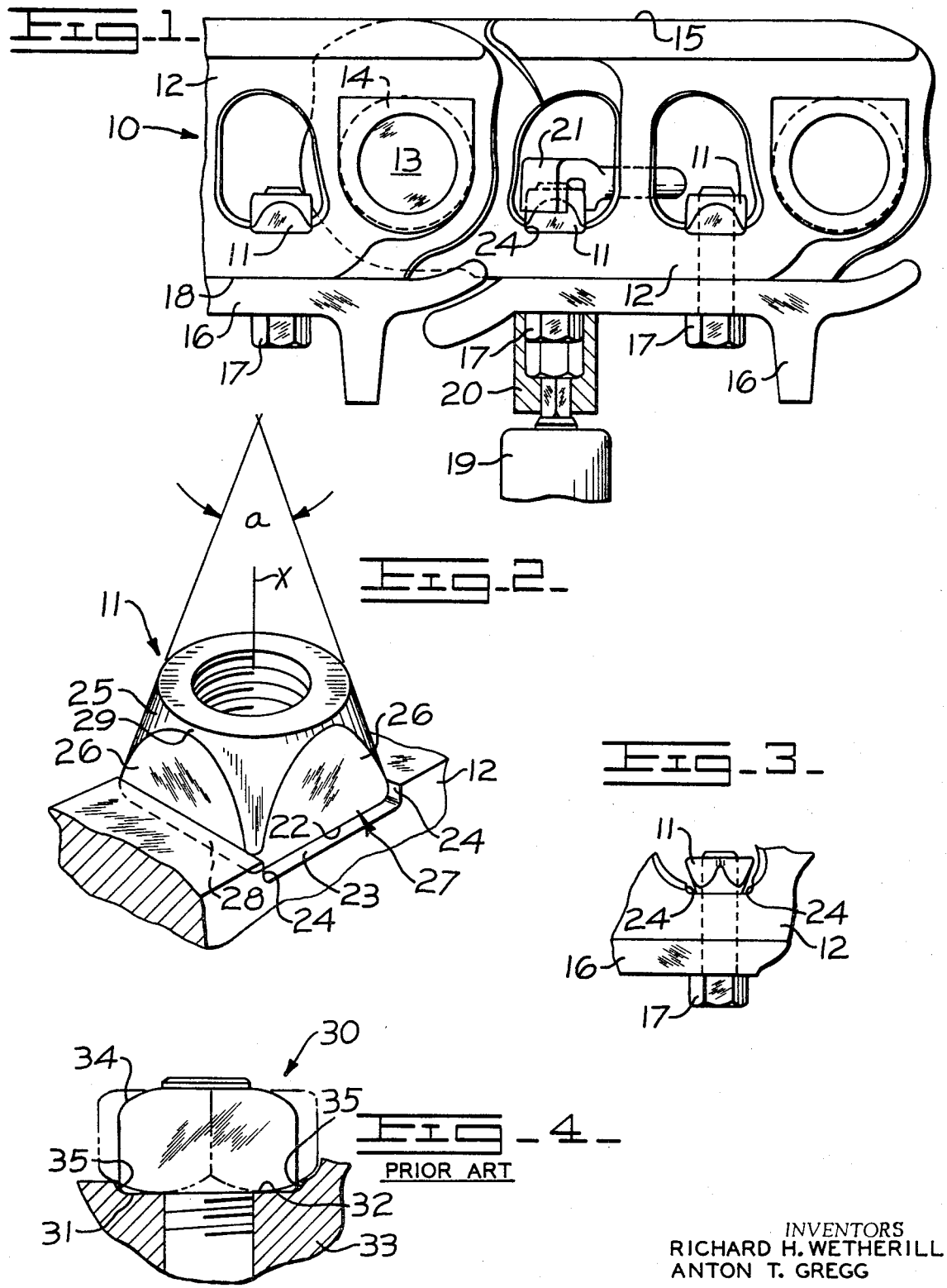

TRACK ASSEMBLY WITH IRREVERSIBLE CONICALLY SHAPED TRACK SHOE NUT

BACKGROUND OF THE INVENTION

Earthmoving equipment, such as crawler tractors, must operate efficiently over extended periods of time and with minimum "down-time" for servicing. Since the equipment is subject to severe operating conditions, all components must exhibit high degrees of structural integrity and manufacturing quality control to assure such operating desiderata. For example, approximately eight hundred nut and bolt arrangements may be utilized in the track assembly of a crawler tractor for securing the track shoes therein. The bolts normally exhibit a tensile strength exceeding 150,000 psi and the attached nuts are subjected to more than 200 ft. lb. of torque to assure positive track shoe retention.

FIG. 4 of the drawing, for example, illustrates a conventional nut having a square lower end and a slightly rounded upper end. Incorrect installation of the nut, whereby its rounded end is positioned in bearing contact with the attached link (dotted line position), will normally not be detected by the production-line workman. During machine operation, the resulting securing torque occasioned by such mis-assembly will normally be insufficient to maintain the nut and bolt in secured relationship. Eventual loosening of the track shoe and its attendant components subjects such components to irreparable damage and may result in costly machine "-down-time" for servicing purposes.

SUMMARY AND OBJECTS OF THE INVENTION

An object of this invention is to overcome the above, briefly described problems by providing an economical and readily assembled nut adapted for correctly and securely attaching a track shoe to a link of an articulated track assembly.

The nut comprises a lower portion, preferably square, defining at least two parallel exterior surface portions thereon and an upper circular portion. Correct nut assembly will find the nut's lower portion seated in a mating recess formed in the link to prevent rotation of the nut when it is threadably attached to a bolt. Incorrect, inverted assembly of the nut is deterred by visual inspection and by the nut's circular upper portion which tends to rotate in the recess to prevent torque application by a production-line workman.

BRIEF DESCRIPTION OF THE DRAWINGS

Other objects of this invention will become apparent from the following description and accompanying drawings wherein:

FIG. 1 is a side elevational view illustrating a portion of an endless track assembly for a crawler tractor with the track assembly undergoing a production-line assembly operation;

FIG. 2 is an enlarged, isometric view of a conically shaped nut and mating recess embodiment of this invention, employed in the track assembly;

FIG. 3 is a partial, side elevational view of the nut as it would appear when it is incorrectly installed in the track assembly; and FIG. 4 is a partial sectional view illustrating installation of a conventional nut in the type of track assembly shown in FIG. 1.

DESCRIPTION OF THE PREFERRED EMBODIMENT

Referring to FIG. 1, an articulated and endless track assembly 10 employs a nut embodiment 11 of this invention therein. The track assembly comprises an adjacent pair of links 12 pivotally connected together by a pin 13 and a bearing bushing 14 in a conventional manner. Aligned upper link surfaces 15 form a continuous rail for engaging the supporting rollers (not shown) of a crawler tractor.

A track shoe 16 is secured by bolts 17 and nuts 11 to a lower surface 18 of the link. Since track-type earthworking machines are subject to severe operating conditions, the track assembly components must continuously exhibit high degrees of structural integrity. For example, should nuts 11 loosen during operation, the normally encountered high drawbar (shear) and impact loads will in turn tend to loosen the track shoes and attendant components.

To assure proper torquing and tightening of the nuts on bolts 17 an air-actuated impact wrench 19, having a socket 20 engageable with the hexagonal head of bolt 17, is employed to threadably couple the bolt and nut together. The nut may be started on the bolt shank, either manually or mechanically, and held in place by a tool 21 prior to its final torque-down by the wrench. Referring to FIG. 2, a flat lower bearing surface 22 of the nut seats on an abutting flat bearing surface 23 of a recess means formed on the link. The recess means is further defined by parallel shoulder portions 24.

The polygonal-sided nut is disposed on a longitudinal axis X thereof and comprises continuous, frusto-conically shaped first outer surface portions 25 intersecting vertically disposed, parabolic and flat second outer surface portions 26 formed on each side of the nut. The nut may be formed by conventional forging techniques whereby the nut is suitably crowned to assume the semi-conical shape illustrated in FIG. 2. The included conical angle $a$, defining conically-shaped surface portions 25, is preferably selected from the range of from 30° to 60° for purposes hereinafter explained.

The bases of surface portions 26 terminate short of the nut's lower end to define a polygonal sided (e.g., square, hexagonal, etc.) lower portion 27 thereon. The lower portion defines at least one pair of vertically disposed and parallel surface portions 28, each formed as a continuation of a respective surface portion 26. A pair of parallel surface portions 28 of the illustrated square-shaped lower portion 27 substantially mate with parallel shoulder portions 24 of the recess means to prevent rotation of the nut upon its securance to the bolt. When the nut is thus properly seated in the recess means, sufficient torque can be applied to the bolt by wrench 19 to positively attach the bolt and nut together.

The nut further comprises a circular upper portion 29 formed on surface portions 25 due to the termination of the apexes of surface portions 26 short of the nut's upper end. The nut's construction affords substantial monetary savings, primarily due to a material savings, ease of nut manufacture and assembly, and the ability to be more readily employed. In addition, the nut's desired design parameters, such as high degrees of strength and durability, are not impaired and the nut aids the production-line workman in correctly installing same.

As shown in FIG. 4, a conventional track shoe nut 30 may comprise a square lower portion 31, intended for seating in a recess 32 formed in a link 33, and a semi-rounded upper portion 34. The close similarity of the two end portions of the nut tends to confuse the production-line workman and, consequently, the nut is occasionally mis-assembled in the inverted position depicted by phantom lines. In such position, tightening of the bolt will normally tend to rotate the nut until its diagonal dimension is jammed between shoulders 35 of recess 32.

Such interference temporarily prevents rotation of the nut to permit the impact wrench to tighten the bolt on the nut. However, such tightening oftentimes proves insufficient and soon after the track assembly is placed in operation normal track shoe loading tends to progressively loosen the attached shoe. If a number of such nuts are inadvertently mis-assembled in an inverted position, the performance of the track assembly and tractor is greatly impaired as afore-mentioned.

Applicants' nut construction deters inverted, mis-assembly thereof (FIG. 3), not only by visual inspection, but also due to the arrangement of circular upper portion 29. In particular, such portion is constructed and dimensioned, primarily due to the conical shaping of surface portions 25 within the above-prescribed range for angle $a$, to freely rotate and not jam between shoulders 24 of the recess means. Therefore, the assembly line workman will not be prone to impart a "false" torquing to bolt 17 to induce the above-described problems.

What is claimed is:

1. A track assembly comprising a track shoe, a link and at least one bolt means releasably attaching said track shoe to said link, said bolt means comprising a bolt extending through said track shoe and said link and a nut threadably attached to said bolt, said nut having a lower portion defining at least two parallel, flat surface portions formed exteriorly thereon to extend a substantial portion of said nut's axial length and a circular upper portion, said nut further comprising frusto-conically shaped first outer surface portions, and parabolic-shaped second outer surface portions formed on each side of said nut, the bases of each of said second outer surface portions terminating short of a lower end of said nut to define said two parallel, flat surface portions, and the apexes of each of said second outer surface portions terminating short of an upper end of said nut to define said circular upper surface portion on said first outer surface portions, said link having recess means formed thereon defining parallel shoulder portions substantially closely mating with the parallel surface portions of said nut for preventing rotation thereof in said recess means, the circular upper portion of said nut constructed and dimensioned relative to said recess means to freely rotate in said recess means upon incorrect, reverse attachment of said nut to said bolt.

2. The invention of claim 1 wherein said track assembly comprises a plurality of said links pivotally connected together, one of said track shoes connected to each of said links by at least two of said bolt means.

3. The invention of claim 1 wherein the lower portion of said nut is square to define two pairs of said parallel surface portions thereon.

4. The invention of claim 1 wherein the included conical angle defining said first outer surface portions is selected from the range of from 30° to 60°.

* * * * *